United States Patent
Yokota (10) Patent No.: US 12,361,720 B2
(45) Date of Patent: Jul. 15, 2025

(54) SYNCHRONIZATION DEVICE, SYNCHRONIZATION METHOD, AND NON-TRANSITORY TANGIBLE COMPUTER READABLE STORAGE MEDIUM

(71) Applicant: DENSO CORPORATION, Kariya (JP)

(72) Inventor: Tadayuki Yokota, Kariya (JP)

(73) Assignee: DENSO CORPORATION, Kariya (JP)

( * ) Notice: Subject to any disclaimer, the term of this patent is extended or adjusted under 35 U.S.C. 154(b) by 504 days.

(21) Appl. No.: 17/660,815

(22) Filed: Apr. 26, 2022

(65) Prior Publication Data

US 2022/0254165 A1 Aug. 11, 2022

Related U.S. Application Data

(63) Continuation of application No. PCT/JP2020/033249, filed on Sep. 2, 2020.

(30) Foreign Application Priority Data

Nov. 1, 2019 (JP) .................... 2019-200222

(51) Int. Cl.
*G06V 20/00* (2022.01)
*B60W 40/11* (2012.01)
(Continued)

(52) U.S. Cl.
CPC ............. *G06V 20/58* (2022.01); *B60W 40/11* (2013.01); *B60W 40/112* (2013.01); *B60W 2420/403* (2013.01)

(58) Field of Classification Search
CPC ........ G06V 20/58; G06V 10/24; G06V 10/62; G06V 20/56; B60W 40/11; B60W 40/112; B60W 2420/403; B60W 40/12; B60W 2520/14; B60W 2520/16; B60W 2520/18; G08C 15/06; H04L 7/00; H04L 7/0033

See application file for complete search history.

(56) References Cited

U.S. PATENT DOCUMENTS

2004/0162654 A1 * 8/2004 Lu .................. B60G 17/0162
                                                              180/282
2018/0372498 A1   12/2018 Nackers et al.
(Continued)

FOREIGN PATENT DOCUMENTS

CN    108279767 A  *  7/2018  .............. G06F 3/011
JP    2002170120 A  *  6/2002  ......... G06K 9/00335
(Continued)

OTHER PUBLICATIONS

Wikipedia, Similarity measure (Year: 2024).*
(Continued)

*Primary Examiner* — Xiao Liu
(74) *Attorney, Agent, or Firm* — Maschoff Brennan (57) ABSTRACT

A synchronization device is for a vehicle equipped with a plurality of sensors including an image sensor. The synchronization device acquires, as data related to a motion state of the vehicle, first time-series data based on detection data detected by the image sensor and second time-series data based on detection data detected by a sensor other than the image sensor. The synchronization device calculates shift time required for matching the first time-series data with the second time-series data.

15 Claims, 3 Drawing Sheets

(51) Int. Cl.
  *B60W 40/112*  (2012.01)
  *G06V 20/58*  (2022.01)

(56) References Cited

U.S. PATENT DOCUMENTS

2021/0056714 A1\* 2/2021 Ishiwatari .............. H04N 23/60
2021/0080259 A1\* 3/2021 Babu .................. G01C 21/1656

FOREIGN PATENT DOCUMENTS

| JP | 2007-327873 A | 12/2007 |
| JP | 2008-051761 A | 3/2008 |

OTHER PUBLICATIONS

Sabe et al., Analysis on real time motion estimation with active stereo camera, Proceedings of 4th IEEE International Workshop on Advanced Motion Control, vol. 1, pp. 365-370 (Year: 1996).\*
Oishi et al., Sensor Fusion Algorithm with Radar and Camera for Fast Target Recognition Using HOG and Machine Learning, IEICE Technical Report, vol. 115 No. 517, pp. 25-30, Mar. 2016, Japan.

\* cited by examiner

SYNCHRONIZATION DEVICE, SYNCHRONIZATION METHOD, AND NON-TRANSITORY TANGIBLE COMPUTER READABLE STORAGE MEDIUM

CROSS REFERENCE TO RELATED APPLICATIONS

The present application is a continuation application of International Patent Application No. PCT/JP2020/033249 filed on Sep. 2, 2020, which designated the U.S. and claims the benefit of priority from Japanese Patent Application No. 2019-200222 filed on Nov. 1, 2019. The entire disclosures of all of the above applications are incorporated herein by reference.

TECHNICAL FIELD

The present disclosure relates to a synchronization device, a synchronization method, and non-transitory tangible computer readable storage medium for synchronizing detection data detected by multiple sensors.

BACKGROUND

A synchronization device that synchronizes time between multiple sensors based on received time information has been proposed. For example, time data of each sensor are corrected based on time information received from a NTP server.

SUMMARY

The present disclosure provides a synchronization device for a vehicle equipped with a plurality of sensors including an image sensor. The synchronization device acquires, as data related to a motion state of the vehicle, first time-series data based on detection data detected by the image sensor and second time-series data based on detection data detected by a sensor other than the image sensor. The synchronization device calculates shift time required for matching the first time-series data with the second time-series data.

BRIEF DESCRIPTION OF DRAWINGS

The features and advantages of the present disclosure will become more apparent from the following detailed description made with reference to the accompanying drawings. In the drawings.

DETAILED DESCRIPTION

For example, a synchronization device in which time data of each sensor are corrected based on time information received from a NTP server has been proposed. In synchronization of detection data of an image sensor and detection data of another sensor, it is desired to synchronize the detection data with each other according to a detection timing by the image sensor. However, in an exemplary synchronization device, it is difficult to identify the time of the detection timing of the image sensor based on the received time information. Therefore, the exemplary synchronization device cannot accurately synchronize the detection data with each other.

The present disclosure provides a synchronization device, a synchronization method, and non-transitory tangible computer readable storage medium capable of accurately synchronizing detection data with each other.

An exemplary embodiment of the present disclosure provides a synchronization device for a vehicle equipped with a plurality of sensors including an image sensor. The synchronization device includes a sensor information acquisition unit, a shift time calculation unit, and a synchronization unit. The sensor information acquisition unit is configured to acquire, as data related to a motion state of the vehicle, first time-series data based on detection data detected by the image sensor and second time-series data based on detection data detected by a sensor other than the image sensor. The shift time calculation unit is configured to calculate shift time required for matching the first time-series data with the second time-series data. The synchronization unit is configured to synchronize the detection data by the image sensor with the detection data by the sensor based on the shift time.

Another exemplary embodiment of the present disclosure provides a synchronization method for a vehicle equipped with a plurality of sensors including an image sensor, and executed by a processor. The synchronization method includes: acquiring, as data related to a motion state of the vehicle, first time-series data based on detection data detected by the image sensor and second time-series data based on detection data detected by a sensor other than the image sensor; calculating shift time required for matching the first time-series data with the second time-series data; and synchronizing the detection data by the image sensor with the detection data by the sensor based on the shift time.

Another exemplary embodiment of the present disclosure provides a non-transitory tangible computer readable storage medium including instructions executed by a processor of a synchronization device. The synchronization device is for a vehicle equipped with a plurality of sensors including an image sensor. The instructions include acquiring, as data related to a motion state of the vehicle, first time-series data based on detection data detected by the image sensor and second time-series data based on detection data detected by a sensor other than the image sensor; calculating shift time required for matching the first time-series data with the second time-series data; and synchronizing the detection data by the image sensor with the detection data by the sensor based on the shift time.

In the exemplary embodiment of the present disclosure, the detection data are synchronized with each other based on the shift time required for matching the time-series data based on the detection data of the image sensor and the time-series data based on the detection data of the other sensor. By using the detection data of the image sensor to calculate the shift time, the detection data of the other sensor are relatively synchronized with the detection timing of the image sensor. Therefore, the configuration can perform more accurate synchronization of the detection data with respect to the detection timing of the image sensor.

First Embodiment

A synchronization device 100 according to a first embodiment will be described with reference to FIGS. 1 to 4. The synchronization device 100 is an electronic control device mounted on the vehicle. The synchronization device 100 synchronizes time between detection data detected by multiple sensors mounted on the vehicle. The multiple detection data which are synchronized in time are used, for example, in self-position estimation of the vehicle. The synchronization device 100 is connected to an Inertial Measurement Unit (IMU) 10, a camera 20, and a self-position estimation device 200 via a communication bus or the like.

Figure 1:
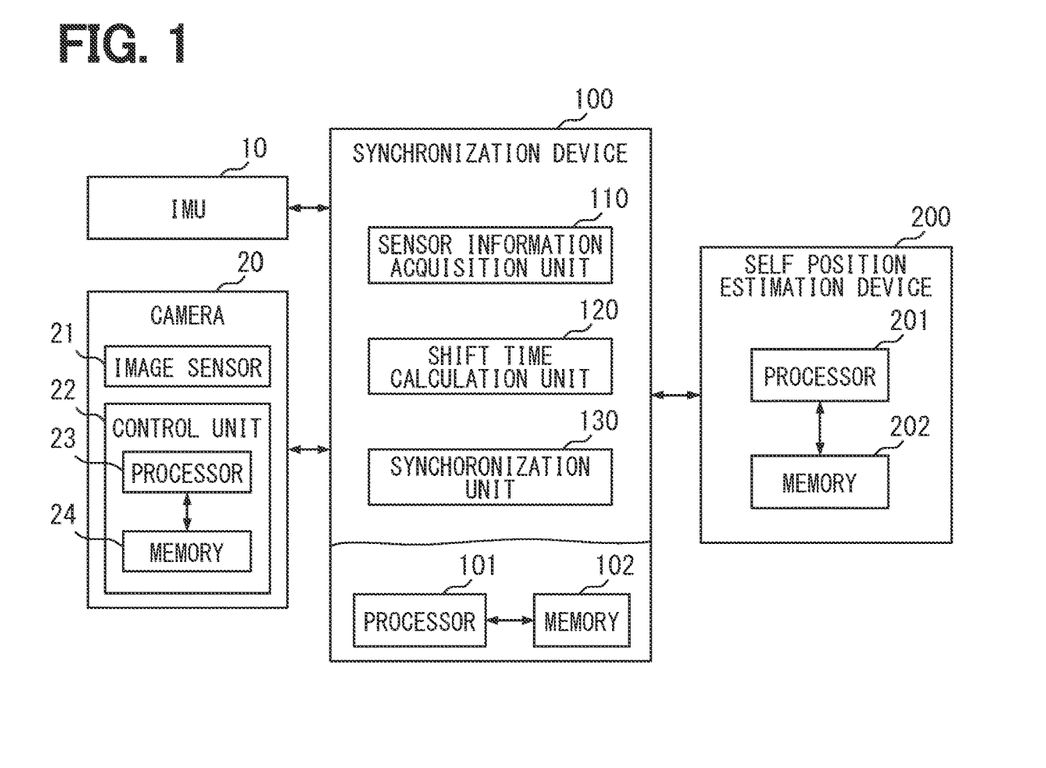
FIG. 1 is a diagram showing a system including a synchronization device.

The IMU 10 is an in-vehicle sensor that detects an inertial force acting on the vehicle. The IMU 10 is provided by, for example, a six-axis motion sensor having a three-axis gyro sensor and a three-axis acceleration sensor. The IMU 10 is capable of detecting each angular velocity acting in the yaw direction, the pitch direction, and the roll direction of the vehicle by the three-axis gyro sensor. That is, the IMU 10 is a sensor capable of detecting data on the same state quantity as the image sensor 21, which will be described later, as data on the motion state of the vehicle. Further, the IMU 10 detects each acceleration acting in the front-rear direction, the up-down direction, and the left-right direction of the vehicle by the three-axis acceleration sensor. The IMU 10 sequentially outputs the measurement results of each gyro sensor and each acceleration sensor to the synchronization device 100 as detection data (inertia data) by the IMU 10. The IMU 10 is an example of "another sensor".

The camera 20 is an imaging device that outputs, as detection data, at least image data obtained by an image sensor 21 capturing a predetermined range around the vehicle at a predetermined frame rate and an analysis result of the image data. The camera 20 is fixed at a predetermined position of the vehicle, for example, with the front of the vehicle as the imaging range. The camera 20 is attached to, for example, the upper end of the front window, the vicinity of the rear-view mirror, the upper surface of the instrument panel, or the like.

The camera 20 includes a lens unit (not shown), the image sensor 21, and a control unit 22. The lens unit forms an image of light from the imaging range on the light receiving surface of the image sensor 21. The image sensor 21 is an imaging device that captures an image in the imaging range. The image sensor 21 converts the light formed on the light receiving surface into an electric signal. The image sensor 21 is provided by a CCD sensor, a CMOS sensor, or the like. The image sensor 21 sequentially outputs an electric signal to the control unit 22. The image sensor 21 is a sensor capable of detecting the angular velocity, which is the same state amount as the state amount detected by the IMU 10, as data indicating the motion state of the vehicle by continuously capturing an image. The angular velocity is analyzed from the image by the angular velocity calculation program described later.

The control unit 22 mainly includes a computer including a processor 23, a memory 24, an input/output interface, a bus connecting these components, and the like. The processor 23 is a hardware for arithmetic processing. The processor 23 includes, as a core, at least one type of, for example, a Central Processing Unit (CPU), a Graphics Processing Unit (GPU), a Reduced Instruction Set Computer (RISC) CPU, and so on.

The memory 24 is at least one type of non-transitory tangible storage medium, such as a semiconductor memory, a magnetic storage medium, and an optical storage medium, for non-transitory storing or memorizing computer readable programs and data. The memory 24 stores various programs executed by the processor 23.

The control unit 22 controls the imaging operation of the image sensor 21 including the exposure state at the time of imaging by the image sensor 21. Specifically, the control unit 22 adjusts the timing of the electronic shutter of the pixel in the image sensor 21 to control the exposure time, selects the readout line, and selects the row and column of the pixel corresponding to the selected readout line to acquire the signal. Alternatively, the control unit 22 may collectively acquire the signals of each pixel. The control unit 22 performs image processing on the electric signal output from the image sensor 21 to generate image data of the actual scene.

Further, the control unit 22 has an angular velocity calculation function for calculating each angular velocity in the yaw direction, pitch direction, and roll direction of the vehicle in cooperation with the image processing function by executing the angular velocity calculation program. The control unit 22 uses visual odometry for calculating the angular velocity, for example. Specifically, the control unit 22 extracts feature points from time-series image data and calculates the angular velocity based on the amount of change in the coordinates of the feature points for each frame. The angular velocity calculated by the control unit 22 includes at least an angular velocity in the pitch direction (pitch rate) and an angular velocity in the roll direction (roll rate). The control unit 22 sequentially provides the image data and the corresponding angular velocity data to the synchronization device 100 as detection data detected by the camera 20.

The self-position estimation device 200 is an electronic control device that estimates the self-position of the vehicle. The self-position estimation device 200, similar to the control unit 22, mainly includes a computer including a processor 201, a memory 202, an input/output interface, a bus connecting these components, and the like. The self-position estimation device 200 realizes the self-position estimation function by executing multiple instructions included in the self-position estimation program stored in the memory 202 by the processor 201. For example, the self-position estimation device 200 predicts the amount of movement of the vehicle by dead reckoning based on the detection data by the IMU 10. Then, the self-position estimation device 200 calculates the correction amount of the lateral and front-rear positions of the vehicle by matching the detection data by the camera 20 with the feature information of the high-precision map. By combining these information, the self-position estimation device 200 estimates the current position and the traveling direction of the vehicle as self-position information. The estimated self-position information is used, for example, for vehicle driving control in automatic driving or advanced driving support.

The synchronization device 100 is an electronic control device that processes the detection data from multiple in-vehicle sensors and provides the detection data to an in-vehicle device such as an ECU. The synchronization device 100 mainly includes a computer including a processor 101, a memory 102, an input/output interface, a bus connecting these components, and the like. The processor 101 is a hardware for arithmetic processing. The processor 101 includes, as a core, at least one type of, for example, a Central Processing Unit (CPU), a Graphics Processing Unit (GPU), a Reduced Instruction Set Computer (RISC) CPU, and so on.

The memory 102 is at least one type of non-transitory tangible storage medium, such as a semiconductor memory, a magnetic storage medium, and an optical storage medium, for non-transitory storing or memorizing computer readable programs and data. The memory 102 stores various programs executed by the processor 101, such as a synchronization program described later.

The processor 101 executes multiple commands included in a synchronization program stored in the memory 102. As a result, the synchronization device 100 constructs multiple functional blocks for driving support. As described above, in the synchronization device 100, multiple functional blocks are constructed by causing the processor 101 to execute multiple instructions by the program stored in the memory 102 for driving support. Specifically, the synchronization device 100 is constructed with functional units such as a sensor information acquisition unit 110, a shift time calculation unit 120, and a synchronization unit 130.

The sensor information acquisition unit 110 acquires the detection data output from the IMU 10 and the camera 20. In particular, the sensor information acquisition unit 110 acquires time-series angular velocity data included in each detection data.

Specifically, the sensor information acquisition unit 110 buffers the angular velocity data output from the IMU 10 in a time series, and generates the time-series data A as the time-series angular velocity data by the IMU 10. The time-series data A is also referred to as first time-series data. Further, the sensor information acquisition unit 110 buffers the angular velocity data output from the camera 20 in a time series, and generates time-series data B as the time-series angular velocity data by the camera 20. The time-series data B is also referred to as second time-series data. Each value in the time series data A and B is associated with time information defined by a timer, a real-time clock, or the like. The time information may be set by the synchronization device 100, or may be set by the IMU 10 and the camera 20, another ECU or the like. Each time series data A and B includes at least pitch rate data and roll rate data. The sensor information acquisition unit 110 may acquire the time-series data A and B generated by the IMU 10 and the camera 20, or another ECU. The sensor information acquisition unit 110 generates the time-series data A and B at a predetermined cycle and provides them to the shift time calculation unit 120.

The shift time calculation unit 120 calculates the shift time required for matching the time-series data A and the time-series data B. Here, matching means that the time-series data A and B substantially match on the time axis. Specifically, the shift time calculation unit 120 searches for, as the shift time, the shift width of the time at which the similarity between the time series data A and B becomes maximum when either one of the time series data A or B is shifted in time from the initial time. In the search for the shift time, the shift time calculation unit 120 uses, for example, likelihood that the time series data A and B match with each other as a parameter indicating the degree of similarity. Here, the likelihood is a value indicating the probability that the time series data A and B match with each other. In this case, the likelihood becomes larger with the increase of the similarity. Therefore, the shift time calculation unit 120 searches for the shift time having the highest likelihood.

The shift time calculation unit 120 calculates a shift time candidate value t for each of the multiple sets of time-series data A and B generated in each predetermined cycle. The shift time calculation unit 120 determines the shift time to be used for actual data synchronization from the multiple candidate values t calculated for each set. For example, the shift time calculation unit 120 calculates the median value of the multiple candidate values t, and sets the median value as the shift time. The shift time calculation unit 120 provides the calculated shift time to the synchronization unit 130.

The synchronization unit 130 synchronizes the detection data of the camera 20 with the detection data of the IMU 10 based on the shift time. For example, the synchronization unit 130 performs synchronization by delaying the detection data of the IMU 10 by the shift time based on the detection data of the camera 20. That is, the time information of the detection data of the camera 20 is not changed, and the time information of the detection data of the IMU 10 is corrected to a time delayed by the shift time. The synchronization unit 130 sequentially provides each synchronized detection data to the self-position estimation device 200 and the like.

The synchronization unit 130 may be configured to output the shift time as synchronization information between the detected data. In this case, the self-position estimation device 200 corrects the time information of the detection data based on the shift time as a pre-processing of the sensor fusion process. In this case, the output of the synchronization information corresponds to the correction of the time difference between the detected data by the synchronization unit 130.

Figure 2:
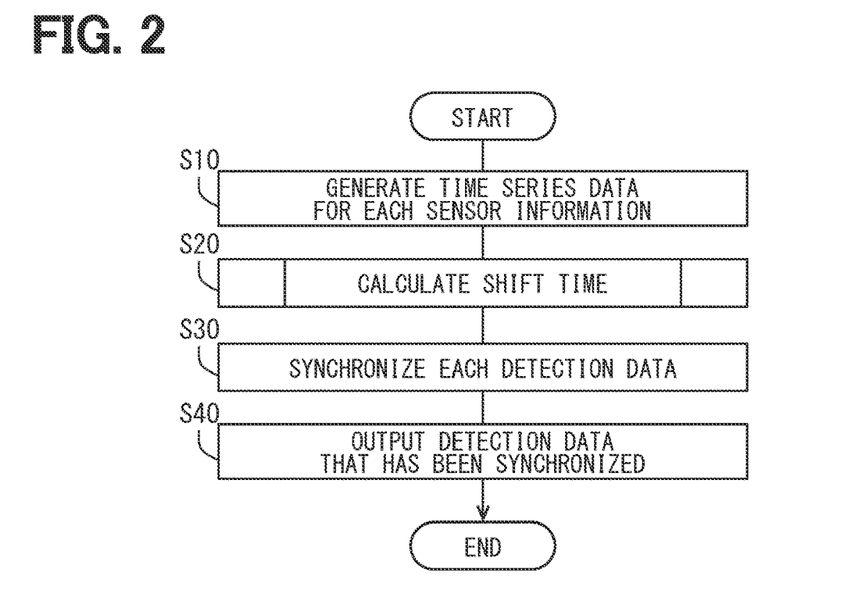
FIG. 2 is a flowchart showing an example of a synchronization method executed by the synchronization device.
Figure 3:
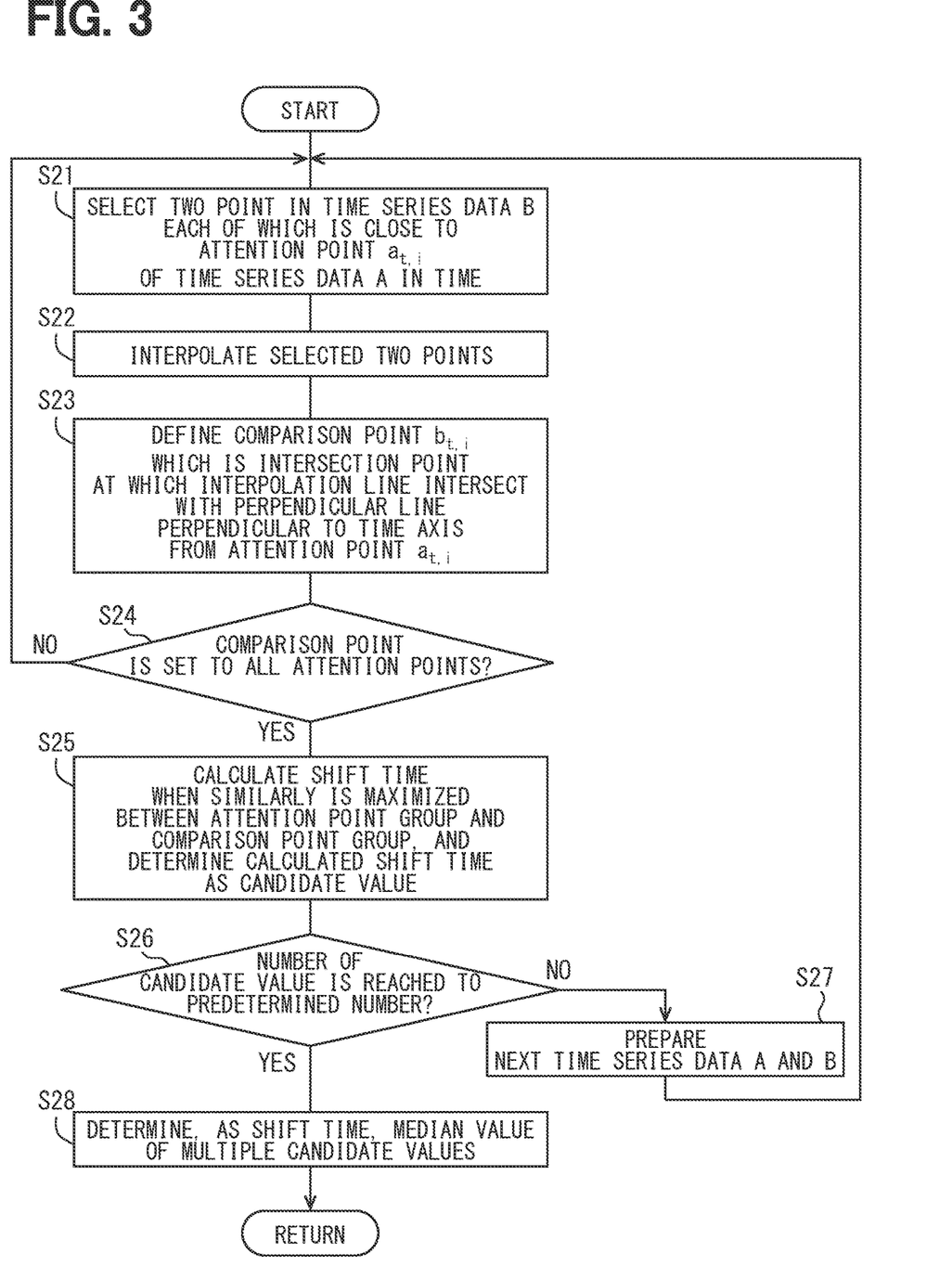
FIG. 3 is a flowchart showing a subroutine processing of FIG. 2.

Next, the flow of the synchronization method executed by the synchronization device 100 jointly by the functional blocks will be described below with reference to FIGS. 2 to 4. In a flow to be described later, "S" means multiple steps of the flow to be executed by multiple instructions included in the program.

First, in S10, the sensor information acquisition unit 110 buffers the angular velocity data included in the detection data provided by the IMU 10 and the detection data provided by the camera 20, and generates time-series data A and B. Next, in S20, the shift time calculation unit 120 determines the candidate value t for the shift time based on the generated time-series data A and B.

The processing of S20 will be described in detail with reference to FIGS. 3 and 4. The flowchart of FIG. 3 shows the subroutine processing in S20. In the diagram of FIG. 4, each time series data A and B are plotted with the horizontal axis as time and the vertical axis as angular velocity. First, in S21 of FIG. 3, an arbitrary interest point $a_{t,i}$ is set from a value included in the time series data A, and two points in the time series data B whose time is close to the interest point $a_{t,i}$ are selected (see FIG. 4).

Figure 4:
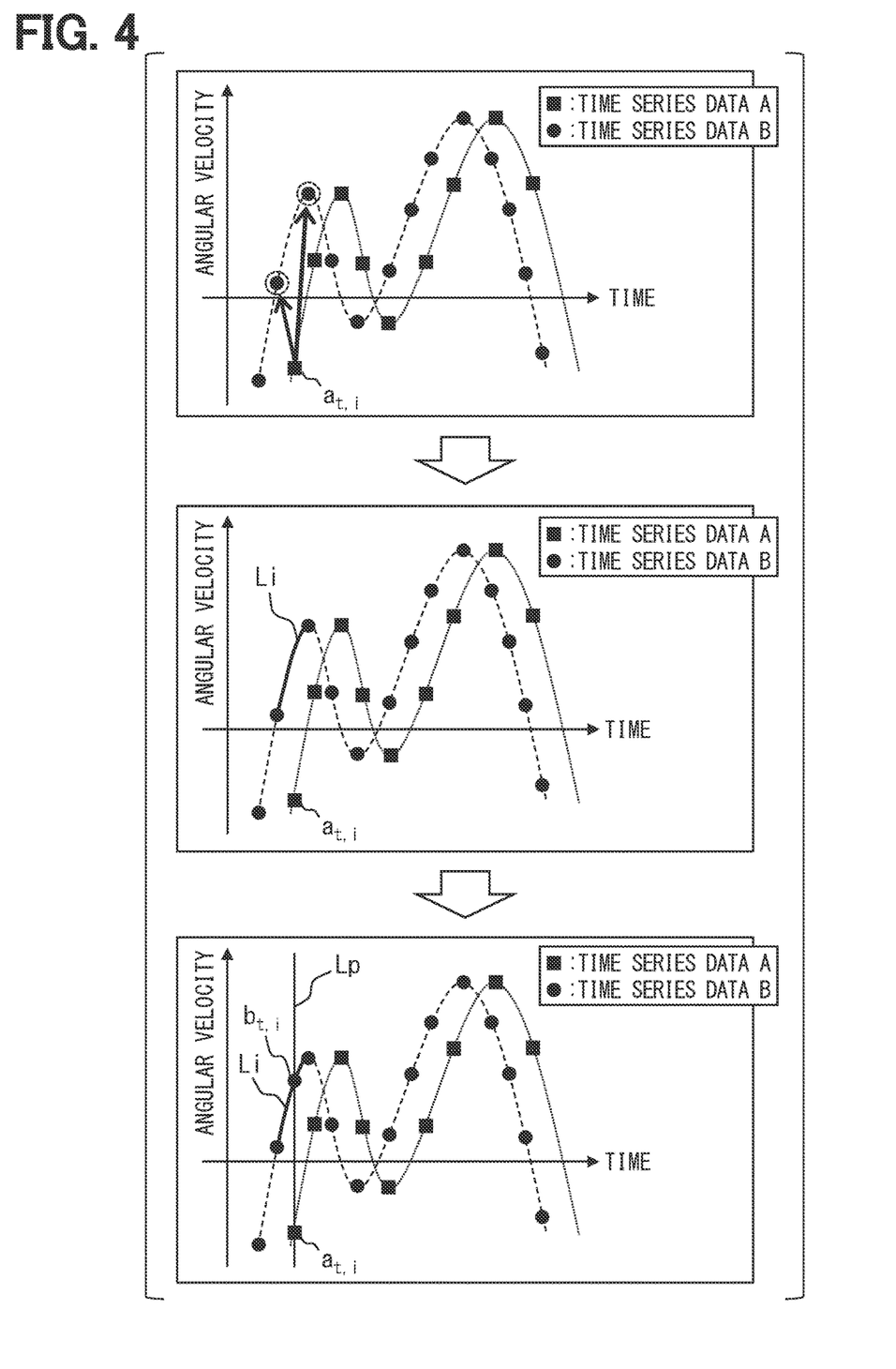
FIG. 4 is an image diagram showing the processing of FIG. 3.

Next, in S22, the selected two points of the time series data B are interpolated by an interpolation line Li (see FIG. 4). For example, in S22, the two points are interpolated by a predetermined interpolation curve such as a spline curve or a cubic function curve. Alternatively, a straight line may interpolate between the two points. Next, in S23, when a perpendicular line Lp is drawn from the interest point $a_{t,i}$ on the time axis, a point where the perpendicular line Lp and the interpolation line Li intersect is set as a comparison point $b_{t,i}$ in the time series data B (See FIG. 4). In other words, in S22 and S23, the value of the time series data B is estimated that the value of the time series data B is detected at the same time as the interest point $a_{t,i}$.

Next, in S24, it is determined whether or not the comparison points are set for all the interest points of the time series data A. If an interest point for which a comparison point has not been set remains, the process returns to S21. On the other hand, if it is determined that the comparison points have been set for all the interest points, the process proceeds to S25.

In S25, the shift time at which the likelihood between the interest point group and the comparison point group is maximum is determined as the candidate value t having the largest degree of similarity. For example, in S25, the candidate value t having a likelihood of maximum value Rmax is searched for based on the following mathematical formula (1). In this case, the likelihood is calculated as the magnitude of the normalized cross-correlation.
(Formula 1)

(Formula 1)

$$R_{max} = \max_{t} \frac{\sum_{i=1}^{N}(a_{t,i} \cdot b_{t,i})}{\sqrt{\sum_{i=1}^{N}(a_{t,i})} \cdot \sqrt{\sum_{i=1}^{N}(b_{t,i})}} \quad (1)$$

When the candidate value t is calculated, the process proceeds to S26. The time-series data for setting the interest point and the time-series data for setting the comparison point may be reversed.

In S26, it is determined whether or not the calculated number of candidate values t has reached a predetermined number set in advance. If it is determined that the calculated number has not reached the predetermined number, the process proceeds to S27. In S27, the next time-series data A and B, that is, the time-series data A and B at different times from the time-series data A and B used for calculating the candidate value t in the immediately preceding process are prepared. When the process of S27 is executed, the process returns to S21, and a new shift time candidate value t is calculated based on the next time-series data A and B.

On the other hand, if it is determined in S25 that the number of candidates has reached the predetermined number, the process proceeds to S28. In S28, the median value of the multiple candidate values t is calculated as the shift time. Next, the subroutine of FIG. 3 is terminated and the process proceeds to S30 in FIG. 2. In S30, the synchronization unit 130 synchronizes the detected data with each other by shifting the time of the detection data by the IMU 10 by the time. Next, in S40, the synchronization unit 130 outputs the synchronized detection data to the self-position estimation device 200, thereby ending a series of processing.

The above-mentioned S10 is an example of an "acquisition process", S20 is an example of a "calculation process", and S30 is an example of a "synchronization process".

Next, the operation and effects of the synchronization device 100 according to the first embodiment will be described.

The synchronization device 100 calculates the shift time required for matching the time-series data based on the detection data by the image sensor 21 and the time-series data based on the detection data by the IMU 10 as another sensor. Then, the synchronization device 100 synchronizes the detection data by the image sensor 21 with the detection data by the IMU 10 based on the shift time. With this configuration, since the shift time is calculated based on the detection data of the image sensor 21, the detection data can be synchronized with each other according to the detection timing of the image sensor 21. Therefore, a synchronization device 100 capable of more accurate synchronization can be provided. Further, this configuration enables synchronization between the sensors without using the positioning signal from the positioning satellite.

Further, the time-series data acquired by the sensor information acquisition unit 110 includes the angular velocity data of the vehicle. The angular velocity can be characteristic time-series data with large temporal fluctuations as compared with other parameters related to the motion state of the vehicle such as acceleration and velocity. Therefore, it becomes easy to calculate the shift time having a higher degree of similarity between the time series data A and B. Therefore, the robustness of synchronization can be further enhanced.

In addition, the angular velocity data includes vehicle pitch rate data. The pitch rate data can largely reflect the change in posture of the vehicle due to traveling as compared with the roll rate data and the yaw rate data. Therefore, time series data can be more volatile over time. Therefore, the robustness of synchronization can be further improved.

Further, the pitch rate data and the roll rate data are acquired as time series data. The roll rate data can largely reflect the change in posture of the vehicle due to traveling as compared with the yaw rate data. Therefore, by using the roll rate data in addition to the pitch rate data to calculate the shift time, the robustness of synchronization can be further improved.

Further, by delaying the detection data by the IMU 10 which is an inertial sensor by a shift time based on the detection data by the camera 20, the time of the detection data by the IMU 10 can be adjusted to the detection data by the camera 20 where the delay is likely to occur.

Further, the similarity between the time series data A and B is calculated for each candidate value of the shift time, and the candidate value having the largest degree of similarity is adopted as the shift time. With this configuration, the shift time for matching the time series data A and B can be calculated by the degree of similarity between the time series data A and B. Therefore, the configuration can perform more accurate synchronization between the detected data.

Further, the magnitude of the likelihood that the time-series data A and B match with each other is calculated as the similarity, and the candidate value having the highest likelihood is adopted as the shift time. With this configuration, the shift time for matching the time series data A and B can be calculated based on the magnitude of the matching likelihood of the time series data A and B.

Second Embodiment

In a second embodiment, a modification of the synchronization device 100 according to the first embodiment will be described. In the second embodiment, the shift time calculation unit 120 calculates, as a candidate value of the shift time, time at which a residual between the time series data A and B becomes the minimum instead of the time at which the time series data A and B have the maximum likelihood of matching with each other. In this case, for example, the shift time calculation unit 120 calculates the difference value between the values of the time series data A and B for each time, and defines the difference value itself or the parameter indicating the sum of the difference value as the residual.

Specifically, the shift time calculation unit 120 sets the comparison point group corresponding to the interest point group as in the first embodiment, and then search for a candidate value t in which the sum of the difference square values between the data becomes the minimum value S1 min, based on the following mathematical formula (2) in S25.

(Formula 2)

(Formula 2)

$$S1_{min} = \min_t \sum_{i=1}^{N} (a_{t,i} - b_{t,i})^2 \quad (2)$$

Alternatively, the shift time calculation unit 120 may search for a candidate value t in which the sum of the absolute values of the differences between the data becomes the minimum value S2 min, based on the following mathematical formula (3).

(Formula 3)

$$S2_{min} = \min_t \sum_{i=1}^{N} |a_{t,i} - b_{t,i}| \quad (3)$$

As described above, the shift time calculation unit 120 can calculate the time at which the residual between the time series data A and B becomes the minimum as the candidate value of the shift time. In this case, the shift time calculation unit 120 can suppress the calculation amount as compared with the case where the candidate value is calculated based on the magnitude of the likelihood.

Other Embodiments

The disclosure in the present specification is not limited to the illustrated embodiments. The disclosure encompasses the illustrated embodiments and modifications based on the embodiments by those skilled in the art. For example, the disclosure is not limited to the parts and/or combinations of elements shown in the embodiments. Disclosure can be implemented in various combinations. The disclosure may have additional parts that may be added to the embodiment. The disclosure encompasses omissions of parts and/or elements of the embodiments. The disclosure encompasses replacement or combination of parts and/or elements between one embodiment and another. The disclosed technical scope is not limited to the description of the embodiment. Several technical scopes disclosed are indicated by descriptions in the claims and should be understood to include all modifications within the meaning and scope equivalent to the descriptions in the claims.

In the above embodiment, the synchronization device 100 acquires the angular velocity data from the camera 20. Instead of this configuration, the synchronization device 100 may be configured to generate angular velocity data by acquiring image data from the camera 20 and analyzing the image data.

In the above embodiment, the synchronization device 100 uses the pitch rate and the roll rate of the vehicle to perform inter-sensor synchronization, but the motion state data used for the inter-sensor synchronization is not limited thereto. The synchronization device 100 can calculate the shift time by using at least one or more time series data of the pitch rate, the roll rate, and the yaw rate. Further, the synchronization device 100 may calculate the shift time by using time series data such as acceleration or speed of the vehicle. The synchronization device 100 can use any data related to the motion state of the vehicle to calculate the shift time.

In the above embodiment, the synchronization device 100 acquires the image data of the camera 20 having the image sensor 21 as the detection data. Instead of this configuration, the synchronization device 100 may acquire point group data by the LIDAR having the image sensor 21 as the detection data.

In the above embodiment, the synchronization device 100 synchronizes the detection data of the camera 20 with the detection data of the IMU 10. Alternatively, the synchronization device 100 may be configured to synchronize the detection data of the camera 20 with the detection data of the LIDAR or another camera. Further, the synchronization device 100 may be configured to synchronize the detection data of the LIDAR and the detection data of the IMU 10.

In the above embodiment, the shift time calculation unit 120 calculates the median value of the multiple shift time candidates as the shift time. Alternatively, the shift time calculation unit 120 may be configured to calculate the average value of the multiple candidates as the shift time. Further, the shift time calculation unit 120 may vote the calculated candidate value for the vote value set at each predetermined time interval, and calculate the vote value having the largest number of voted candidate values as the shift time. In this case, the shift time calculation unit 120 may set the voting destination of the candidate value to the vote value to which the candidate value corresponds when the candidate value is rounded.

The synchronization device 100 may be a special purpose computer configured to include at least one of a digital circuit and an analog circuit as a processor. In particular, the digital circuit is at least one type of, for example, an ASIC (Application Specific Integrated Circuit), a FPGA (Field Programmable Gate Array), an SOC (System on a Chip), a PGA (Programmable Gate Array), a CPLD (Complex Programmable Logic Device), and the like. Such a digital circuit may include a memory in which a program is stored.

The synchronization device 100 may be a set of computer resources linked by a computer or data communication device. For example, some of the functions provided by the synchronization device 100 in the above-described embodiment may be realized by another ECU.

What is claimed is:
1. A synchronization device for a vehicle equipped with a plurality of sensors including an image sensor, the synchronization device comprising:
a sensor information acquisition unit configured to acquire, as data related to a motion state of the vehicle, first time-series data included in detection data detected by the image sensor and second time-series data included in detection data detected by a second sensor other than the image sensor;
a shift time calculation unit configured to calculate shift time required for matching the first time-series data with the second time-series data; and
a synchronization unit configured to synchronize the detection data by the image sensor with the detection data by the second sensor based on the shift time, wherein
the sensor information acquisition unit acquires, as the first time-series data, time-series angular velocity data based on changes in feature points extracted from time-series image data detected by the image sensor, and acquires, as the second time-series data included in the detection data detected by the second sensor, second time-series angular velocity data detected by an inertial sensor that detects angular velocity of the vehicle from an inertial force acting on the vehicle, and the synchronization unit delays, by the shift time, the detection data detected by the inertial sensor based on the detection data by the image sensor, and wherein the shift time calculation unit selects an arbitrary interest point from the first time-series data and two points from the second time-series data whose times are closest to the arbitrary interest point, the shift time calculation unit interpolates between the two points of the second time-series data using an interpolation curve or a straight line as an interpolation line, and the shift time calculation unit calculates a point where a perpendicular line from the arbitrary interest point intersects the interpolation line to define a comparison point in the second time-series data.

2. The synchronization device according to claim 1, wherein the sensor information acquisition unit acquires the first time-series data and the second time-series data each including angular velocity data of the vehicle.

3. The synchronization device according to claim 2, wherein the sensor information acquisition unit acquires the angular velocity data including pitch rate data of the vehicle.

4. The synchronization device according to claim 3, wherein the sensor information acquisition unit acquires roll rate data of the vehicle in addition to the pitch rate data.

5. The synchronization device according to claim 1, wherein the shift time calculation unit (i) sets a plurality of candidate values for the shift time, (ii) calculates a similarity between the first time-series data and the second time-series data for each candidate value, and (iii) selects a candidate value having a highest similarity as the shift time.

6. The synchronization device according to claim 5, wherein the shift time calculation unit (i) calculates, as the similarity, a magnitude of a likelihood in which the first time-series data and the second time-series data match with each other, and (ii) selects a candidate value having a highest likelihood as the shift time.

7. The synchronization device according to claim 5, wherein the shift time calculation unit (i) calculates, as the similarity, a magnitude of a residual between the first time-series data and the second time-series data, and (ii) selects a candidate value having a smallest residual as the shift time.

8. A synchronization method for a vehicle equipped with a plurality of sensors including an image sensor, and executed by a processor, the synchronization method comprising:

acquiring, as data related to a motion state of the vehicle, first time-series data included in detection data detected by the image sensor and second time-series data included in detection data detected by a second sensor other than the image sensor;

calculating shift time required for matching the first time-series data with the second time-series data, wherein calculating the shift time comprises:

selecting an arbitrary interest point from the first time-series data and two points from the second time-series data whose times are closest to the arbitrary interest point;

interpolating between the two points of the second time-series data using an interpolation curve or a straight line as an interpolation line; and calculating a point where a perpendicular line from the arbitrary interest point intersects the interpolation line to define a comparison point in the second time-series data; and synchronizing the detection data by the image sensor with the detection data by the second sensor based on the shift time, wherein the acquiring of time-series data includes acquiring, as the first time-series data, time-series angular velocity data based on changes in feature points extracted from time-series image data detected by the image sensor, and acquiring, as the second time-series data included in the detection data detected by the second sensor, second time-series angular velocity data detected by an inertial sensor that detects angular velocity of the vehicle from an inertial force acting on the vehicle, and the synchronizing the detection data by the image sensor with the detection data by the sensor based on the shift time includes delaying, by the shift time, the detection data detected by the inertial sensor based on the detection data by the image sensor.

9. The synchronization method according to claim 8, wherein the first time-series data and the second time-series data each include angular velocity data of the vehicle.

10. The synchronization method according to claim 9, wherein the angular velocity data include pitch rate data of the vehicle.

11. The synchronization method according to claim 10, wherein the angular velocity data include roll rate data of the vehicle in addition to the pitch rate data.

12. The synchronization method according to claim 8, wherein the calculating the shift time includes
setting a plurality of candidate values for the shift time,
calculating a similarity between the first time-series data and the second time-series data for each candidate value, and
selecting a candidate value having a highest similarity as the shift time.

13. The synchronization method according to claim 12, wherein the calculating the shift time further includes
calculating, as the similarity, a magnitude of a likelihood in which the first time-series data and the second time-series data match with each other, and
selecting a candidate value having a highest likelihood as the shift time.

14. The synchronization method according to claim 12, wherein the calculating the shift time further includes
calculates, as the similarity, a magnitude of a residual between the first time-series data and the second time-series data, and
selecting a candidate value having a smallest residual as the shift time.

15. A non-transitory tangible computer readable storage medium comprising instructions executed by a processor of a synchronization device, the synchronization device being for a vehicle equipped with a plurality of sensors including an image sensor, the instructions comprising:

acquiring, as data related to a motion state of the vehicle, first time-series data included in detection data detected by the image sensor and second time-series data included in detection data detected by a second sensor other than the image sensor;

calculating shift time required for matching the first time-series data with the second time-series data, wherein calculating the shift time comprises:

selecting an arbitrary interest point from the first time-series data and two points from the second time-series data whose times are closest to the arbitrary interest point;

interpolating between the two points of the second time-series data using an interpolation curve or a straight line as an interpolation line; and calculating a point where a perpendicular line from the arbitrary interest point intersects the interpolation line to define a comparison point in the second time-series data; and synchronizing the detection data by the image sensor with the detection data by the second sensor based on the shift time, wherein the acquiring of time-series data includes acquiring, as the first time-series data, time-series angular velocity data based on changes in feature points extracted from time-series image data detected by the image sensor, and acquiring, as the second time-series data included in the detection data detected by the second sensor, second time-series angular velocity data detected by an inertial sensor that detects angular velocity of the vehicle from an inertial force acting on the vehicle, and the synchronizing the detection data by the image sensor with the detection data by the sensor based on the shift time includes delaying, by the shift time, the detection data detected by the inertial sensor based on the detection data by the image sensor.

\* \* \* \* \*